United States Patent
Tajima et al.

(10) Patent No.: US 10,193,411 B2
(45) Date of Patent: Jan. 29, 2019

(54) OUTER ROTOR MOTOR

(71) Applicant: HONDA MOTOR CO., LTD., Tokyo (JP)

(72) Inventors: Tomoharu Tajima, Wako (JP); Shingo Tsuruoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 15/040,912

(22) Filed: Feb. 10, 2016

(65) Prior Publication Data

US 2016/0268870 A1    Sep. 15, 2016

(30) Foreign Application Priority Data

Mar. 12, 2015    (JP) .................................. 2015-048943

(51) Int. Cl.
*H02K 5/24* (2006.01)
*H02K 1/18* (2006.01)
*H02K 1/27* (2006.01)

(52) U.S. Cl.
CPC ............... *H02K 5/24* (2013.01); *H02K 1/187* (2013.01); *H02K 1/2786* (2013.01)

(58) Field of Classification Search
CPC ............ H02K 1/18; H02K 1/187; H02K 5/24; H02K 1/2786
USPC .............................. 310/51; 181/207, 208, 209
See application file for complete search history.

(56) References Cited

U.S. PATENT DOCUMENTS

| 2,809,724 | A | * | 10/1957 | Wallerstein, Jr. | ......... F16F 7/08 188/129 |
| 5,027,026 | A |   | 6/1991  | Mineta et al. | |
| 5,975,539 | A | * | 11/1999 | Ueda | ...................... F16J 15/123 277/593 |
| 6,510,716 | B1 | * | 1/2003 | Kim | ...................... D06F 37/304 68/140 |

(Continued)

FOREIGN PATENT DOCUMENTS

| CN | 2038577 U | * | 5/1989 |
| CN | 2038577 U |   | 5/1989 |

(Continued)

OTHER PUBLICATIONS

Kikuchi (DE 3329720 A1) English Translation.*

(Continued)

*Primary Examiner* — Quyen P Leung
*Assistant Examiner* — Robert E Mates
(74) *Attorney, Agent, or Firm* — Rankin, Hill & Clark LLP (57) ABSTRACT

An outer rotor motor includes a mounting seat portion provided inside a motor case, and a protruding portion protruding from the mounting seat portion. An inner stator has a stator opening portion formed centrally thereof, and a mounting portion is formed adjacent the stator opening portion. A vibration isolating member is interposed between the mounting seat portion and the mounting portion with the stator opening portion telescopically fitting over the protruding portion. The vibration isolating member includes a pair of foam rubber layers and a metal base material sandwiched between the pair of foam rubber layers. A bolt fastens the mounting seat portion and the mounting portion together while compressing the vibration isolating member.

4 Claims, 9 Drawing Sheets

(56) References Cited

U.S. PATENT DOCUMENTS

| | | | | |
|---|---|---|---|---|
| 2002/0145348 A1* | 10/2002 | Anma | ............ | H02K 1/2786 310/91 |
| 2004/0113507 A1* | 6/2004 | Yoda | ............ | H02K 11/048 310/179 |
| 2005/0099080 A1 | 5/2005 | Matsumoto et al. | | |
| 2005/0121859 A1* | 6/2005 | Seidel | ............ | F16J 15/061 277/628 |
| 2006/0250034 A1* | 11/2006 | Umezu | ............ | H02K 1/2786 310/67 R |
| 2008/0218009 A1 | 9/2008 | Fukuno et al. | | |
| 2012/0313464 A1 | 12/2012 | Fukuoka et al. | | |
| 2014/0184000 A1* | 7/2014 | Smirnov | ............ | H02K 5/163 310/90 |

FOREIGN PATENT DOCUMENTS

| | | |
|---|---|---|
| CN | 101260939 A | 9/2008 |
| CN | 101415511 A | 4/2009 |
| CN | 103671919 A | 3/2014 |
| DE | 3329720 A1 * | 2/1984 ............ F02P 1/08 |
| EP | 1 172 917 A2 | 1/2002 |
| JP | 01-157565 U | 10/1989 |
| JP | 04-017794 U | 2/1992 |
| JP | 09-201023 | 7/1997 |
| JP | 2000-350397 A | 12/2000 |
| JP | 2005-143248 A | 6/2005 |
| JP | 2007-16976 | 1/2007 |
| JP | 2012-254488 A | 12/2012 |

OTHER PUBLICATIONS

Zu (CN 2038577 U) English Translation (Year: 1989).*
European Search Report dated Jul. 28, 2016.
Japanese Office Action dated Jun. 22, 2016, with English translation of pertinent portions, 5 pages.
Chinese Office Action dated May 10, 2018 with English Translation, 11 pages.
European Office Action dated Nov. 13, 2018, Application No. 16 151 253.8, 7 pages.

* cited by examiner

OUTER ROTOR MOTOR

FIELD OF THE INVENTION

The present invention relates to an outer rotor motor having an inner stator accommodated in a motor case, and an outer rotor disposed along an outer circumference of the inner stator.

BACKGROUND OF THE INVENTION

A known motor includes a stator having an outer frame supported by a base through a filler (hereinafter referred to as "vibration isolating member"). The base has coils thereon and a rotor is rotatably supported adjacent the base.

Since the outer frame of the stator is supported by the base through the vibration isolating member, an electromagnetic vibrating force transmitted from the coils via the base to the outer frame (i.e., the stator) is reduced by the vibration isolating member to thereby reduce a noise of the motor. Such a known motor is disclosed in, e.g., JP 9-201023.

For the motor disclosed in JP 9-201023, the vibration isolating member supports the outer frame of the stator in order to reduce the electromagnetic vibrating force of the stator. Thus, the vibration isolating member is large in size to conform to the outer frame of the stator. The large size of the vibration isolating member causes difficulty in reducing the size and cost of the motor. From this point, the motor has room for improvement.

SUMMARY OF THE INVENTION

An object of the present invention is to provide a small-sized and low-cost outer rotor motor producing a reduced noise.

According to one aspect of the present invention, there is provided an outer rotor motor comprising a metal motor case having an inner space, an inner stator disposed in the inner space of the motor case and having an outer circumference, and an outer rotor disposed along the outer circumference of the inner stator, the motor case comprising: a mounting seat portion provided in the inner space of the motor case, the mounting seat portion having an inside; and a protruding portion protruding from the inside of the mounting seat portion, the inner stator comprising: an opening portion formed centrally of the inner stator, the opening portion being formed to telescopically fit over the protruding portion; a mounting portion formed adjacent the opening portion, the mounting portion facing the mounting seat portion with the opening portion telescopically fitting over the protruding portion, the outer rotor motor further comprising: a vibration isolating member interposed between the mounting seat portion and the mounting portion, the vibration isolating member including elastic members and a metal base material sandwiched between the elastic members; and a fastener fastening the mounting portion and the mounting seat portion together while compressing the vibration isolating member.

The motor case includes the mounting seat portion and the protruding portion. The opening portion and the mounting portion are provided centrally of the inner stator. The mounting portion faces the mounting seat portion when the opening portion telescopically fits over the protruding portion. The vibration isolating member is interposed between the mounting seat portion and the mounting portion. The fastener fastens the mounting seat portion and the mounting portion together while compressing the vibration isolating member.

The vibration isolating member contains the metal base material. The metal base material maintains a fastening torque (i.e., a fastening force) of the fastener. That is, the vibration isolating member, which is interposed between the mounting seat portion and the mounting portion, tolerates a degree of radial freedom of the inner stator and allows the fastener to fasten the mounting seat portion and the mounting portion together. As a result, an electromagnetic vibrating force of the inner stator is suppressed or reduced by the vibration isolating member, thereby reducing a noise of the outer rotor motor.

The opening portion is formed centrally of the inner stator. The mounting portion is provided adjacent the stator opening portion. Since the vibration isolating member is interposed between the mounting seat portion and the mounting portion, the shape of the vibration isolating member is small. Due to the small shape of the vibration isolating member, the outer rotor motor is small in size and low in cost.

The opening portion telescopically fits over the protruding portion provided inside the motor case. As a result, a radial position of the inner stator relative to the motor case is set by the protruding portion fitting in the opening portion. Thus, the inner stator is accurately mounted to the motor case.

Since the opening portion telescopically fits over the protruding portion, the degree of the radial freedom of the inner stator is achieved. The vibration isolating member suppresses or reduces the electromagnetic vibrating force of the inner stator to thereby reduce the noise of the outer rotor motor even though the opening portion fits over the protruding portion.

Since the vibration isolating member is interposed between the mounting seat portion and the mounting portion, heat generated by coil portions of the inner stator would be otherwise unlikely to be transmitted from the mounting portion to the mounting seat portion. In this regard, the opening portion of the inner stator telescopically fits over the protruding portion of the motor case. Since the protruding portion is held in contact with the opening portion, thus, the heat generated by the coil portions of the inner stator is transmitted through the protruding portion to the motor case. Since the heat is released from the inner stator in this manner, the inner stator ensures its heat-releasing property to thereby keep its temperature appropriate.

Preferably, the protruding portion has a contact area contacting the opening portion, the contact area being at least a half of an area of the opening portion.

The contact area of the protruding portion is at least the half of the area of the opening portion. This achieves a sufficient contact between the protruding portion and the opening portion to thereby ensure a preferred transmission of heat generated by the coil portions of the inner stator from the protruding portion to the motor case. As a result, the inner stator keeps its temperature appropriate. Preferably, the contact area of the protruding portion is three-fourths of the area of the opening portion.

The reason that the contact area of the protruding portion is at least the half of the area of the opening portion is as follows. If the contact area of the protruding portion is less than half the area of the opening portion, the contact between the protruding portion and the opening portion is insufficient. The insufficient contact would make difficult a preferable transmission of heat generated by the coil portions of the inner stator from the protruding portion to the motor case. As a result, the inner stator would be unlikely to ensure its heat-releasing property. For these reasons, the contact area of the protruding portion is at least the half of the area of the opening portion. This results in a preferred transmission of heat generated by the coil portions of the inner stator from the protruding portion to the motor case. The inner stator thus ensures its heat-releasing property to thereby keep its temperature appropriate.

If the contact area of the protruding portion exceeds the three-fourths of the area of the opening portion, the protruding portion is so long that it takes a lot of time and effort for the opening portion to telescopically fit over the protruding portion. For this reason, the contact area of the protruding portion is preferably the three-fourths of the area of the opening portion. Therefore, the work of telescopic fitting of the opening portion over the protruding portion is done without requiring a lot of time and effort.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

The term "front" refers to a direction of protrusion of an output shaft 17 from a motor case 11 while the term "rear" or "rearwardly" refers to a direction opposite from the direction of protrusion of the output shaft 17.

Figure 1:
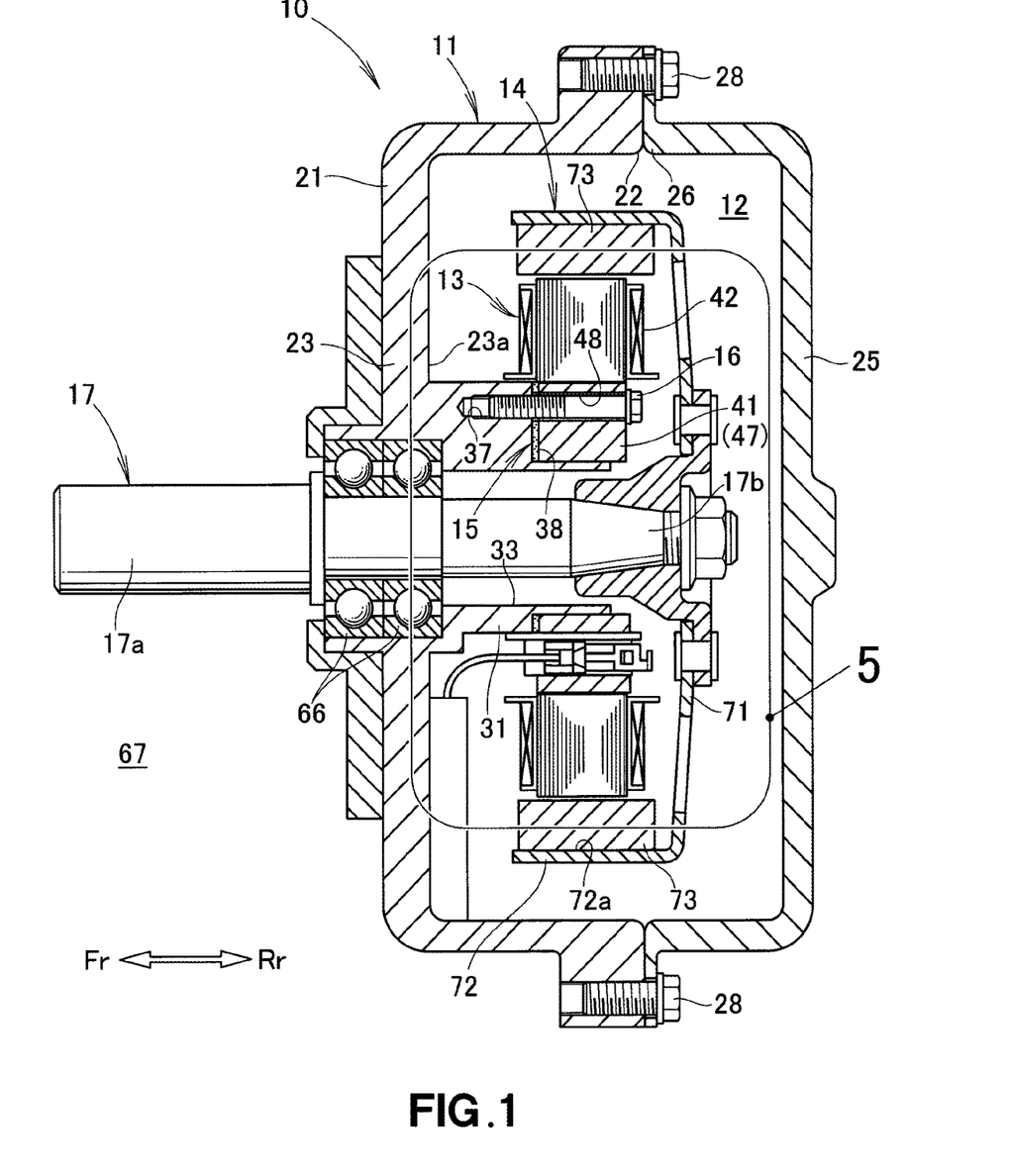
FIG. 1 is a cross-sectional view of an outer rotor motor according to the present invention.
Figure 2:
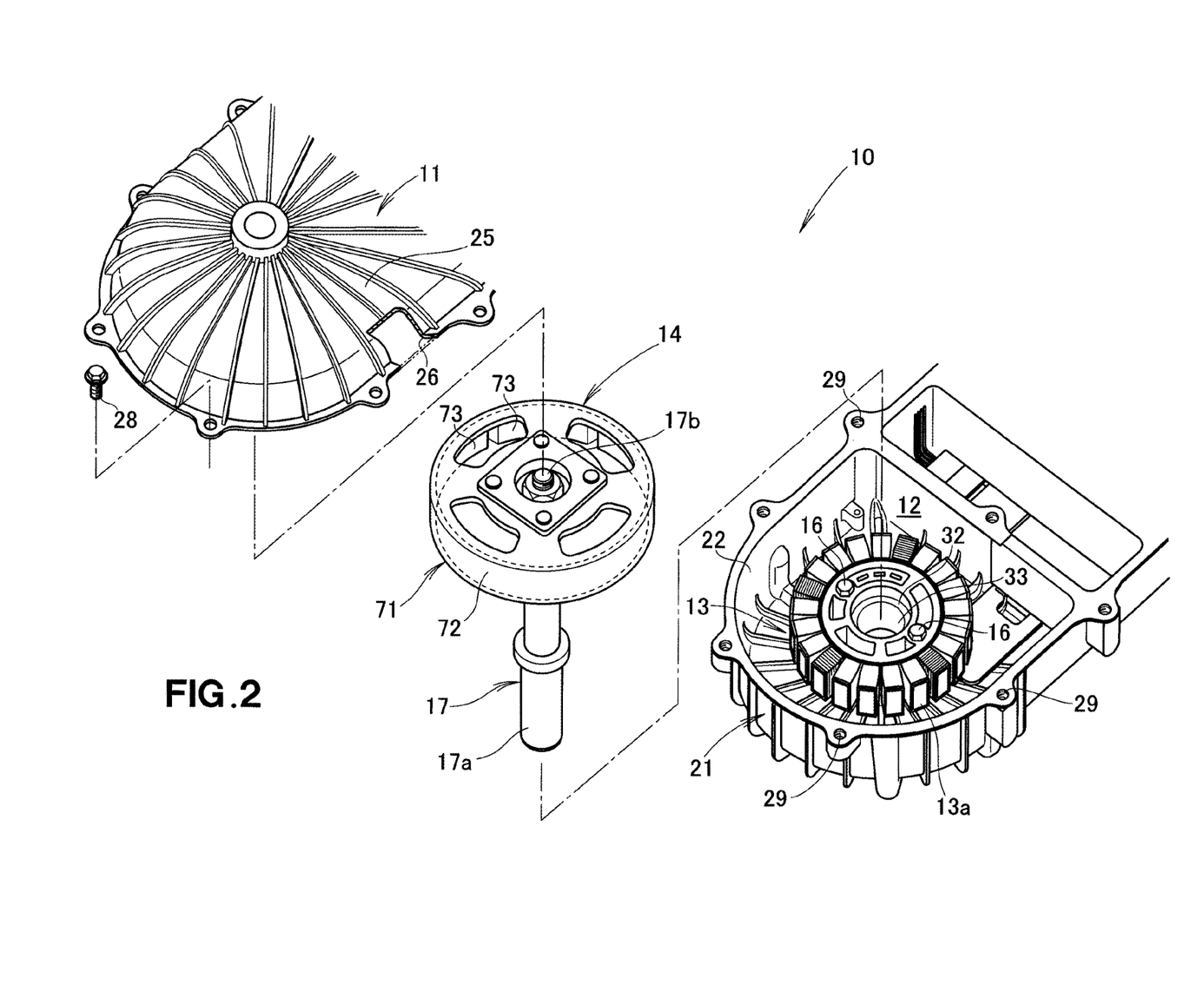
FIG. 2 is an exploded perspective view of the outer rotor motor shown in FIG. 1.

As shown in FIGS. 1 and 2, an outer rotor motor 10 includes the motor case 11 made of metal, an inner stator 13 and an outer rotor 14. The inner stator 13 and the outer rotor 14 are accommodated in an inner space 12 of the motor case 11. The motor 10 further includes a vibration isolating member 15 interposed between the inner stator 13 and the motor case 11, and the output shaft 17 attached to the outer rotor 14.

Figure 3:
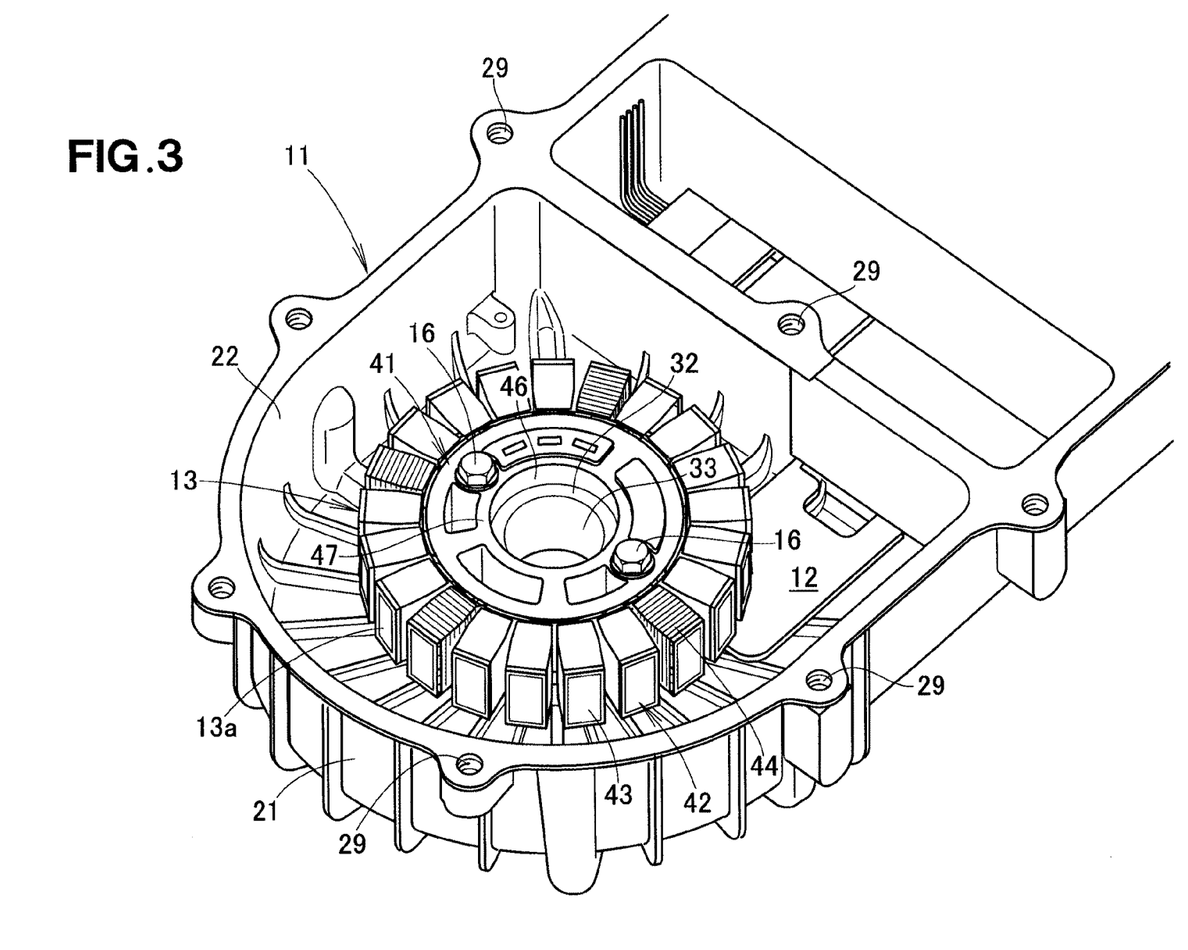
FIG. 3 is a perspective view of a case body and inner stator shown in FIG. 2.

As shown in FIG. 3, the inner stator 13 is secured to the motor case 11 by a plurality of bolts (fasteners) 16. The outer rotor 14 is rotatably supported by the case 11 through the output shaft 17 (FIG. 1). The outer rotor motor 10 is, e.g., an outer rotor blushless DC motor.

Turning back to FIGS. 1 and 2, the motor case 11 includes a metal case body 21 having a rear end portion defining a rear opening 22. The motor case 11 further includes a metal case cover 25 having a front end portion facing the case body 21. The front end portion of the case cover 25 defines a front opening 26. The case cover 25 is detachably attached to the case body 21 by a plurality of bolts 28.

Figure 4:
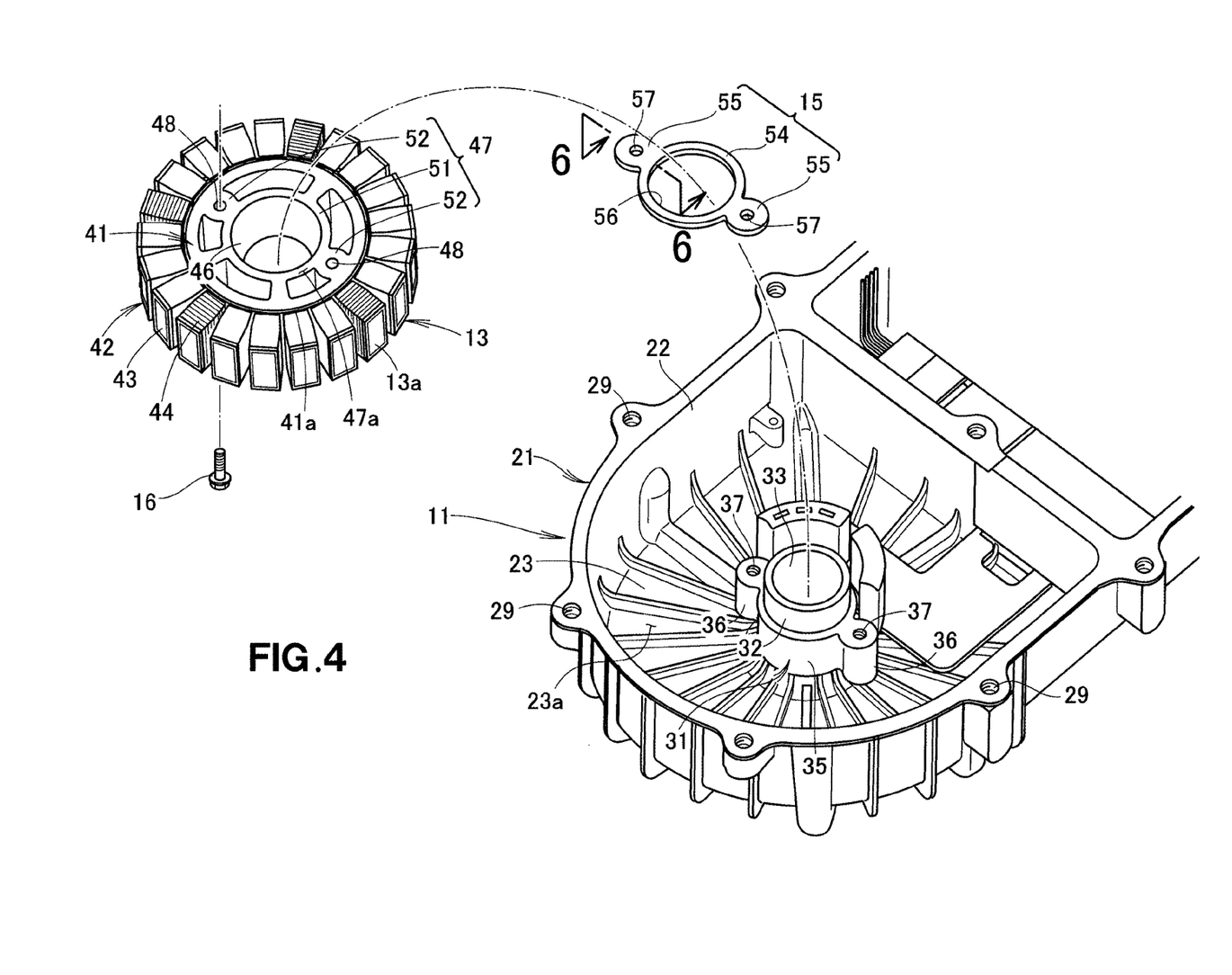
FIG. 4 is an exploded perspective view showing that the inner stator and a vibration isolating member are removed from the case body.

As shown in FIG. 4, the case body 21 includes a boss 31 protruding from an inner surface 23a of a front wall 23 into the inner space 12. The case body 21 further includes a tubular protruding portion 32 which protrudes from a distal end portion of the boss 31. The case body 21 has a case through-hole 33. The case through-hole 33 is formed through the protruding portion 32, the boss 31 and the front wall 23.

Turning back to FIG. 2, the case body 21 and the case cover 25, which defines the motor case 11, are assembled together by a plurality of bolts 28 screwed into threaded holes 29, with the rear end portion of the case body 21 disposed on the front end portion of the case cover 25 in alignment therewith. That is, when the case body 21 and the case cover 25 are assembled together, the rear opening 22 is closed by the case cover 25 while the front opening 26 is closed by the case body 21.

Figure 5:
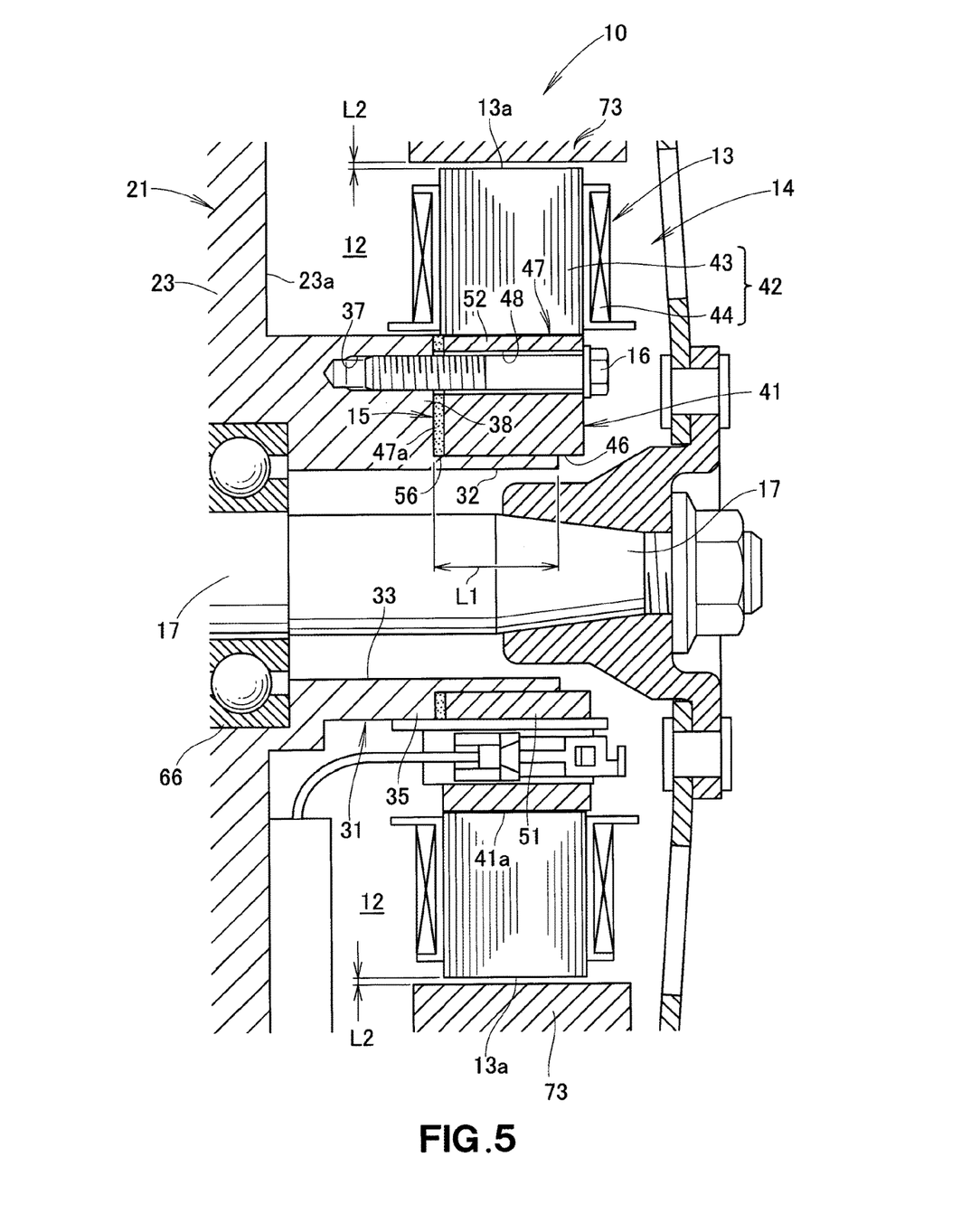
FIG. 5 is an enlarged view of a region 5 in FIG. 1.

As shown in FIGS. 4 and 5, the boss 31 protrudes rearwardly from the inner surface 23a of the front wall 23 of the case body 21 into the inner space 12. The boss 31 has an annular boss portion 35 protruding in the form of a tube around the case through-hole 33. The boss 31 further has a pair of fastening boss portions 36, 36 protruding from an outer peripheral surface of the annular boss portion 35 in a radial and outward direction of the case through-hole 33. The fastening boss portion 36 is generally circular as viewed in top plan, and defines a threaded hole 37 extending in parallel to the case through-hole 33.

The annular boss portion 35 and the pair of fastening boss portions 36, 36 have their respective distal ends flush with one another. These distal ends constitute the distal end portion of the boss 31, and the distal end portion of the boss 31 defines a planar mounting seat portion 38. The inner stator 13 is mounted on the mounting seat portion 38 by the plurality of bolts 16. The mounting seat portion 38 is formed to face a mounting portion 47 of the inner stator 13, as will be discussed later.

Formed on the distal end portion of the boss 31 is the protruding portion 32. More specifically, the protruding portion 32 is located radially inwardly of the mounting seat portion 38 and is in the form of a tube protruding rearwardly from the distal end portion of the boss 31. The protruding portion 32 has a protrusion dimension L1. As will be discussed later, the protruding portion 32 protrudes the dimension L1 within a stator opening portion 46 when an outer circumferential surface of the protruding portion 32 mates with the inside of the stator opening portion 46. That is, the protruding portion 32 comes into contact with the stator opening portion 46 by telescopically fitting into the stator opening portion 46.

The inner stator 13 is accommodated in the inner space 12 of the motor case 11. The inner stator 13 includes an annular base 41 made of metal, and a plurality of coil portions 42 protruding radially from an outer circumferential portion of the annular base 41.

Each coil portion 42 includes a stator core 43 protruding radially from an outer circumferential surface 41a of the annular base 41 and a coil 44 wound on the stator core 43. The plural stator cores 43 have their respective outer ends defining an outer circumference 13a of the inner stator 13.

The annular base 41 is opened at a center thereof. That is, this central opening is defined by the stator opening portion 46 formed through the center of the annular base 41. The annular base 41 has the mounting portion 47 formed adjacent a radial outside of the stator opening portion 46. The annular base 41 further has a pair of mounting holes 48 extending through the mounting portion 47.

The stator opening portion 46 telescopically fits over the protruding portion 32 of the case body 21. That is, the stator opening portion 46 is in contact with the protruding portion 32 as the stator opening portion 46 fits over the protruding portion 32.

The stator opening portion 46 has its entire area S1 and the protruding portion 32 has an area S2 contacting the stator opening portion 46. The area S1 of the stator opening portion 46, the contact area S2 of the protruding portion 32 and the protrusion dimension L1 of the protruding portion 32 have a predetermined relationship. More specifically, the protrusion dimension L1 is set such that the contact area S2 is at least a half of the area S1 when the stator opening portion 46 fits over the protruding portion 32.

The mounting portion 47 is formed adjacent the radial outside of the stator opening portion 46. The mounting portion 47 faces the mounting seat portion 38 with the stator opening portion 46 fitting over the protruding portion 32.

More specifically the mounting portion 47 includes an annular part 51 facing the distal end of the annular boss portion 35, and a pair of fastening parts 52 protruding from an outer peripheral surface of the annular part 51 in a radial outward direction of the stator opening portion 46. The annular part 51 has an inner wall defining the stator opening portion 46.

The fastening part 52 is in a generally circular shape as viewed in plan to face the fastening boss portion 36. The mounting hole 48 is formed through the fastening part 52 in parallel to the stator opening portion 46. The mounting hole 48 is coaxial with the threaded hole 37.

The annular part 51 has a front surface flush with front surfaces of the pair of fastening parts 52. The front surface of the annular part 51 and the front surfaces of the fastening parts 52 define a planar mounting surface 47a. When the stator opening portion 46 telescopically fits over the protruding portion 32, the mounting surface 47a of the mounting portion 47 faces the mounting seat portion 38 with the vibration isolating member 15 interposed between the mounting seat portion 38 and the mounting surface 47a. In this state, the pair of mounting holes 48 is coaxial with the pair of threaded holes 37.

The vibration isolating member 15 includes an annular vibration isolating portion 54 interposed between the annular boss portion 35 and the annular part 51, and a pair of fastening vibration isolating portions 55 each interposed between the fastening boss portion 36 and the fastening part 52. The annular vibration isolating portion 54 has an inner wall defining a vibration isolating hole 56. The vibration isolating hole 56 is opened to fit over the protruding portion 32 of the case body 21.

The fastening vibration isolating portion 55 is in a generally circular shape as viewed in plan to face the fastening boss portion 36 and the fastening part 52. The fastening vibration isolating portion 55 has a through-hole 57 formed therethrough in parallel to the vibration isolating hole 56. The through-hole 57 is coaxial with the threaded hole 37 and the mounting hole 48. The bolt 16 is inserted through the mounting hole 48 and the through-hole 57 and threadedly engages the threaded hole 37.

Figure 6:
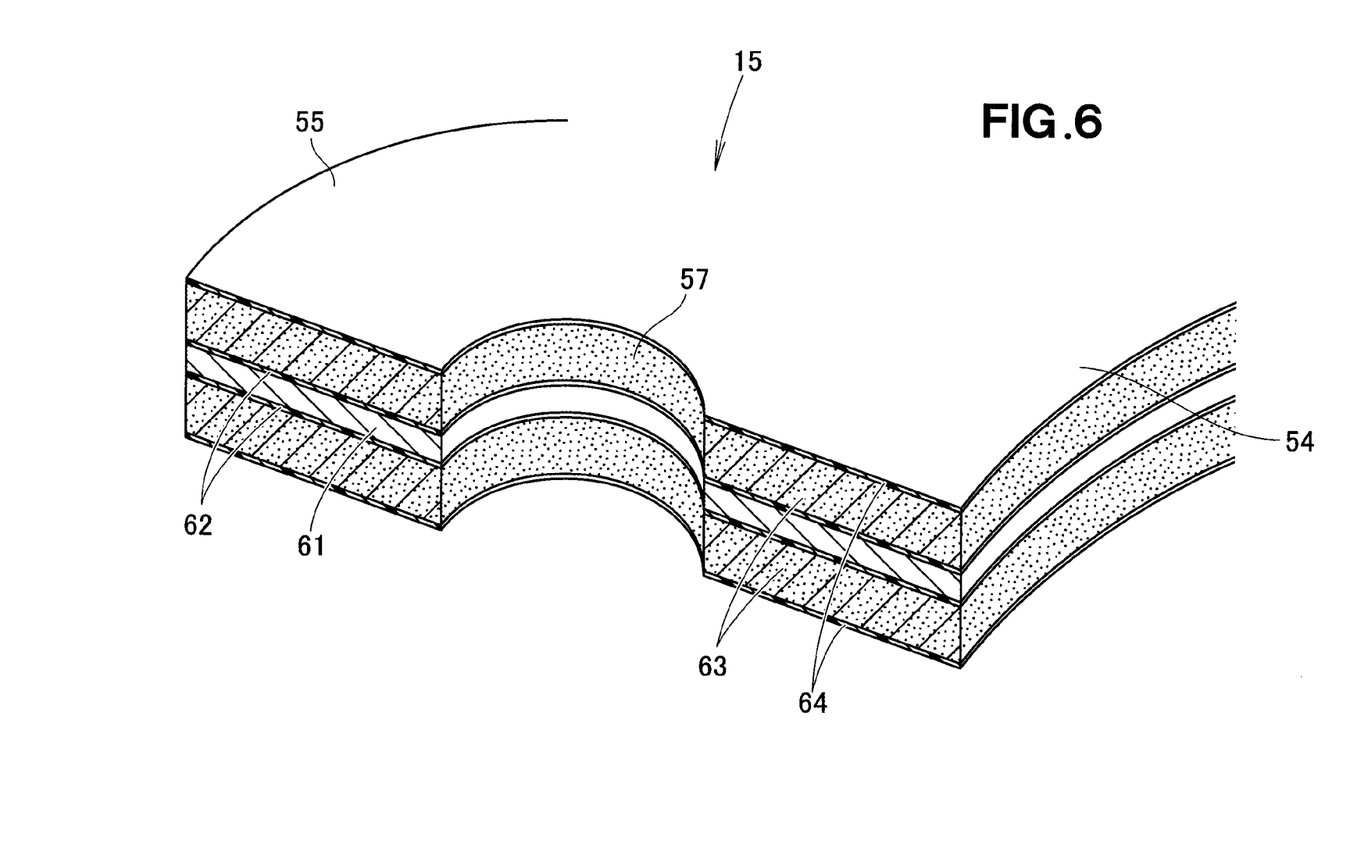
FIG. 6 is a fragmentary perspective view of the vibration isolating member of FIG. 5.

As shown in FIG. 6, the fastening vibration isolating portion 55 includes a metal base material 61 of the same shape as the fastening vibration isolating portion 55, a foam rubber layer (i.e., a rubber sponge) 63 adhering to one surface of the metal base material 61 via an adhesive agent 62, and a graphite layer 64 laminated on a surface of the foam rubber layer 63. The fastening vibration isolating portion 55 further includes an opposite foam rubber layer (rubber sponge) 63 adhering to an opposite surface of the metal base material 61 via an adhesive agent 62, and an opposite graphite layer 64 laminated on a surface of the opposite foam rubber layer 63.

In short, the metal base material 61 is sandwiched between the pair of foam rubber layers 63, 63. The pair of foam rubber layers 63, 63 is elastic members. The pair of graphite layers 64, 64 are high heat-resistant.

Figure 7:
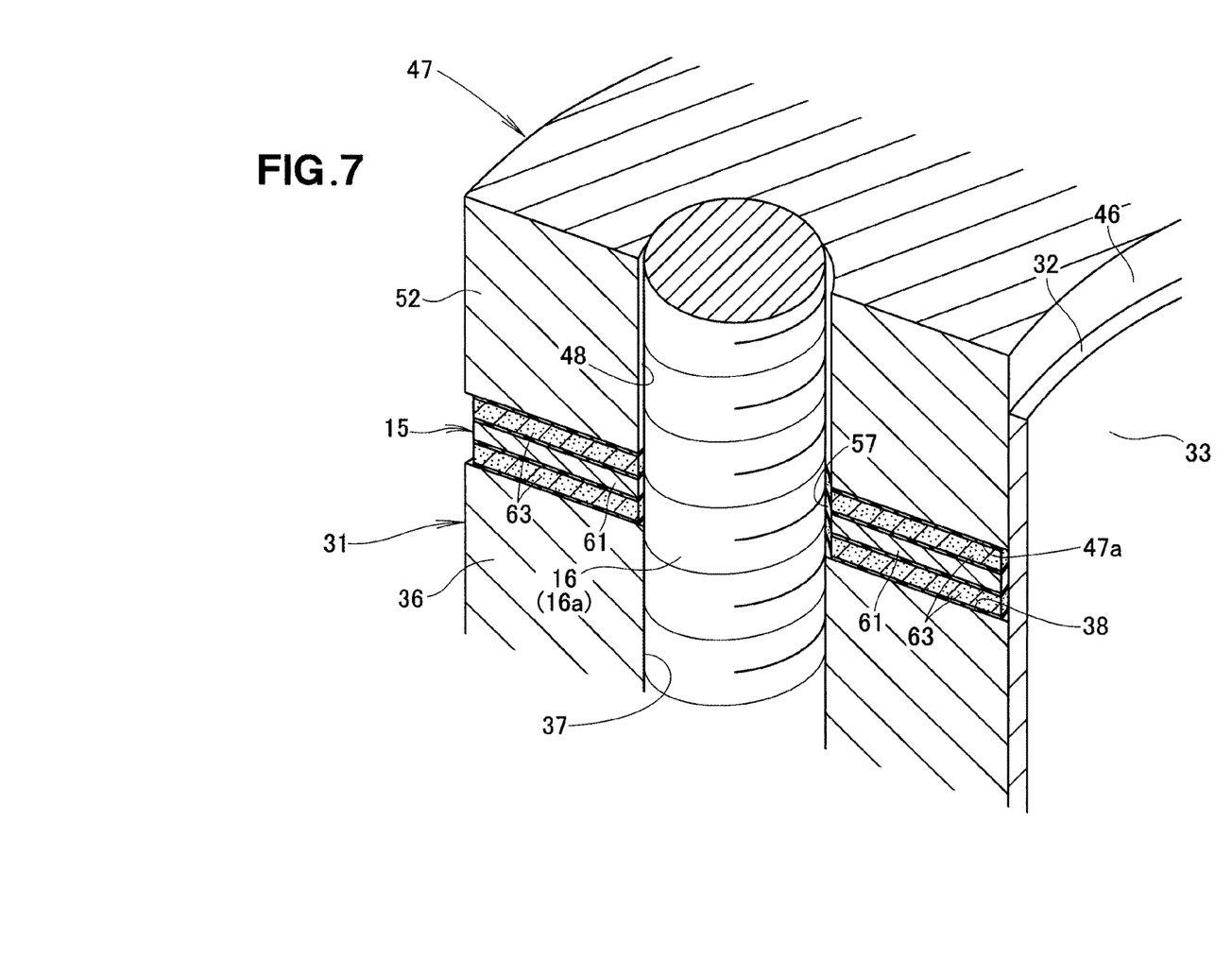
FIG. 7 is a perspective view showing that the vibration-isolating member is fastened by a fastener as the vibration isolating member is interposed between a mounting seat portion of the case body and a mounting portion of the inner stator.

As shown in FIGS. 5 and 7, the stator opening portion 46 of the inner stator 13 telescopically fits over the protruding portion 32 of the case body 21. In this state, a threaded portion 16a of the bolt 16 inserted through the mounting hole 48 and the through-hole 57 threadedly engages the threaded hole 37. As a result, the mounting seal portion 38 and the mounting portion 47 are fastened together by the plurality of bolts 16 as the pair of foam rubber layers 63 of the fastening vibration isolating portion 55 is compressed. In this manner, the inner stator 13 is mounted to the mounting seat portion 38 of the case body 21.

Turning back to FIGS. 1 and 2, the output shaft 17 is rotatably supported by the case through-hole 33 through bearings 66. The output shaft 17 has a front end portion 17a disposed in the outside 67 located forwardly of the case body 21, and a rear end portion 17b accommodated in the inner space 12 of the motor case 21.

Mounted to the rear end portion 17b of the output shaft 17 is a rotor portion 71 of the outer rotor 14. A plurality of permanent magnets 73 is provided on an inner surface 72a of an outer circumference 72 of the rotor portion 71. The permanent magnets 73 are multi-pole magnets disposed around the outer circumference 13a of the inner stator 13. The inner stator 13 and the outer rotor 14 thus arranged are accommodated in the inner space 12 of the motor case 11.

As discussed above, the vibration isolating member 15 contains the metal base material 61 (FIG. 7). When the inner stator 13 is mounted to the mounting seat portion 38 of the case body 21 by the plurality of bolts 16, as shown in FIG. 5, the bolt 16 has a fastening torque (i.e., a axial force of the bolt 16) maintained by the metal base material 61 (FIG. 7).

The stator opening portion 46 telescopically fits over the protruding portion 32 provided inside the motor case 11. As a result, a radial position of the inner stator 13 relative to the motor case 11 is set by the protruding portion 32. Thus, the inner stator 13 is accurately mounted to the motor case 11.

As discussed above, the fastening torque of the bolt 16 is maintained and the accurate mounting of the inner stator 13 is achieved by the protruding portion 32. Thus, the inner stator 13 is accurately positioned relative to the outer rotor 14, such that an air gap dimension L2 between the outer circumference 13a of the inner stator 13 and the plurality of permanent magnets 73 is set to a preferred dimension.

As discussed above, the vibration isolating member 15 is interposed between the mounting seat portion 38 and the mounting portion 47. The metal base material 61 (FIG. 7) of the vibration isolating member 15 maintains the fastening torque of the bolt 16 while the pair of foam rubber layers 63 (FIG. 7) tolerates a degree of radial freedom of the inner stator 13. Since the inner stator 13 has the degree of radial freedom, a vibration of the inner stator 13 is suppressed or reduced. More specifically, the inner stator 13 can produce an electromagnetic vibrating force due to voltage applied to the coil portions 42 of the inner stator 13. This electromagnetic vibrating force is suppressed or reduced by the pair of foam rubber layers 63 to thereby reduce a noise of the outer rotor motor 10.

Since the stator opening portion 46 telescopically fits over the protruding portion 32, the positioning of the inner stator 13 is achieved by the protruding portion 32 while the degree of the radial freedom of the inner stator 13 is achieved.

The vibration isolating member 15 suppresses or reduces the electromagnetic vibrating force of the inner stator 13 to thereby reduce the noise of the outer rotor motor even though the stator opening portion 46 fits over the protruding portion 32.

As shown in FIG. 4, the stator opening portion 46 is formed centrally of the inner stator 13. The mounting portion 47 is provided adjacent the stator opening portion 46. Since the vibration isolating member 15 is interposed between the mounting seat portion 38 and the mounting portion 47, the shape of the vibration isolating member 15 is small. Due to the small shape of the vibration isolating member 15, the outer rotor motor 10 is small in size and low in cost.

Figure 8:
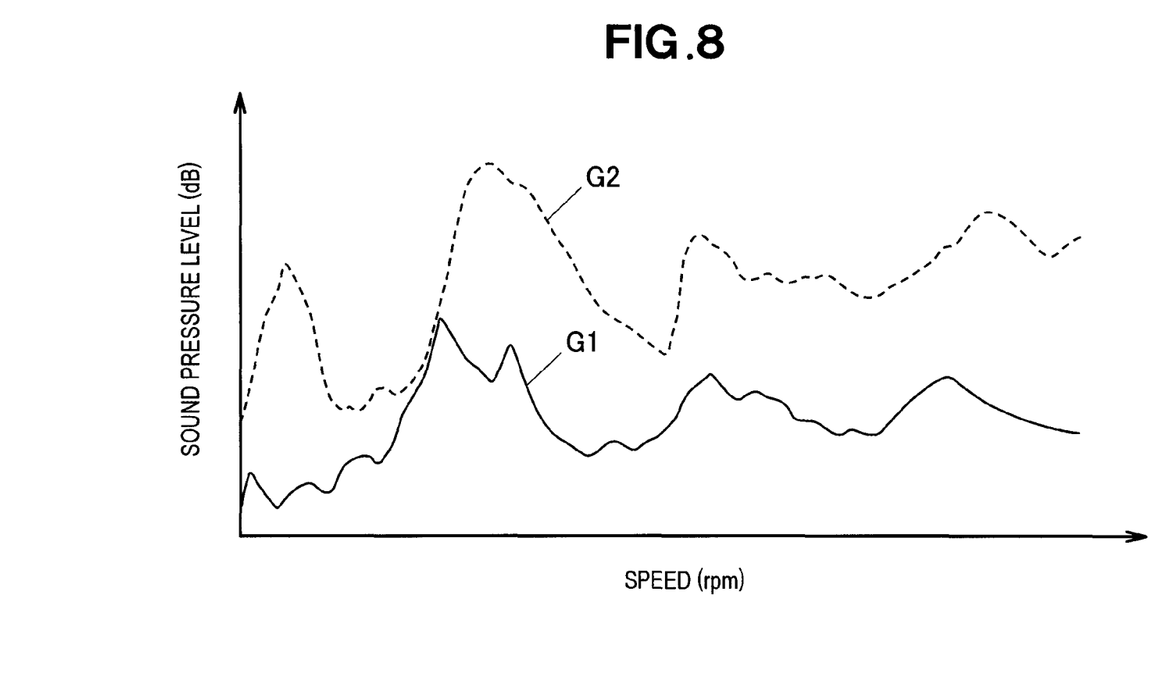
FIG. 8 is a graph showing a noise level of the outer rotor motor according to the present invention.

A noise level of the outer rotor motor 10 (FIG. 1) is discussed with reference to FIG. 8. FIG. 8 shows a graph having an abscissa axis indicating a noise level (dB) produced by the outer rotor motor 10 and an ordinate axis indicating a speed (rpm) of the inner stator. A curve G1 shows a noise level of the outer rotor motor 10 with respect to the speed of the inner stator. A curve G2 shows a noise level of a conventional outer rotor motor without the vibration isolating member 15, with respect to the speed of the inner stator.

As shown in FIG. 8, the curve G1 for the noise level of the outer rotor motor 10 is located below the curve G2 for the noise level of the conventional outer rotor motor. The curve G1 demonstrates that the noise of the outer rotor motor is reduced because the vibration isolating member 15 suppresses or reduces the electromagnetic vibrating force of the inner stator 13.

Figure 9:
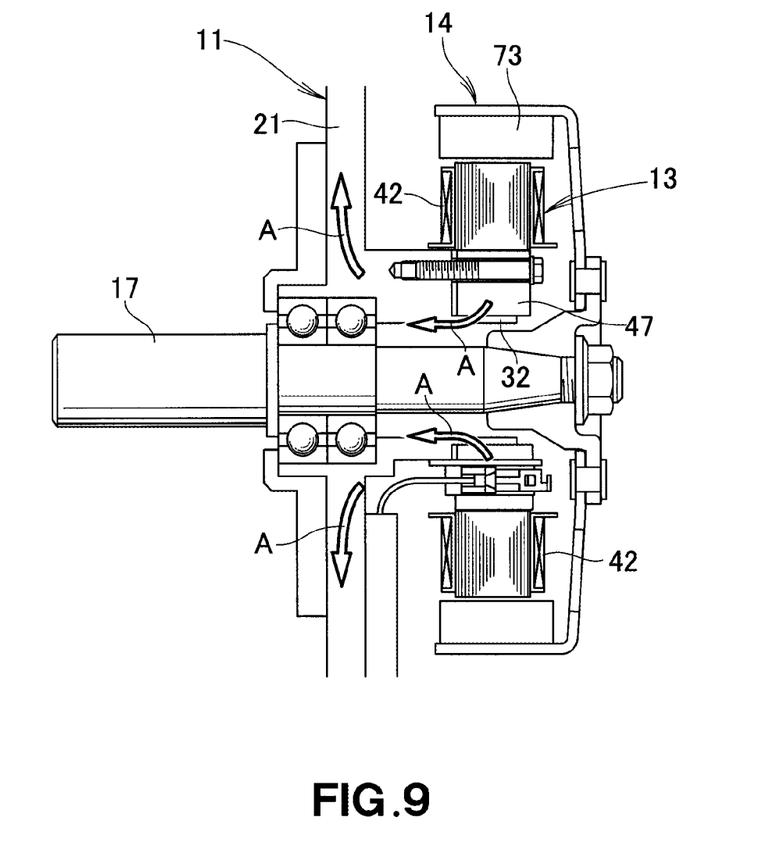
FIG. 9 is a view showing a heat-releasing property of the inner stator.

Referring back to FIG. 5, the coil portions 42 of the inner stator 13 generate heat due to voltage applied to the coil portions 42. Since the vibration isolating member 15 is interposed between the mounting seat portion 38 and the mounting surface 47a of the mounting portion 47, the heat generated by the coil portions 42 would be otherwise unlikely to be transmitted from the mounting portion 47 to the mounting seat portion 38. In this regard, as stated above, the protruding portion 32 protrudes the dimension L1 and the stator opening portion 46 of the inner stator 13 telescopically fits over the protruding portion 32 of the motor case 11, such that the protruding portion 32 contacts the stator opening portion 46 over the area S2 which is at least the half of the area S1 of the stator opening portion 46. With this arrangement, heat generated by the coil portions 42 of the inner stator 13 and transmitted to the mounting portion 47 is transmitted through the protruding portion 32 to the motor case 11 (i.e., the case body 21), as indicated by an arrow A of FIG. 9. The heat transmitted to the case body 21 is thus released from the same. Since the heat is released in this manner, the inner stator 13 ensures its heat-releasing property to thereby keep its temperature appropriate.

The reason that the contact area S2 of the protruding portion 32 is at least the half of the area of the stator opening portion 46 is as follows.

If the contact area S2 of the protruding portion 32 is less than half the area of the stator opening portion 46, the contact between the protruding portion 32 and the stator opening portion 46 is insufficient. The insufficient contact would make difficult a preferable transmission of heat generated by the coil portions 42 of the inner stator 13 from the protruding portion 32 to the case body 21. As a result, the inner stator 13 would be unlikely to keep its temperature appropriate. For these reasons, the contact area S2 of the protruding portion 32 is at least the half of the area of the stator opening portion 46. This results in a preferred transmission of heat generated by the coil portions 42 of the inner stator 13 from the protruding portion 32 to the case body 21. The inner stator 13 thus ensures its heat-releasing property to thereby keep its temperature appropriate.

Preferably, the contact area S2 is three-fourths of the area S1 of the stator opening portion 46. If the contact area S2 of the protruding portion 32 exceeds the three-fourths of the area of the stator opening portion 46, the protruding portion 32 is so long that it takes a lot of time and effort for the stator opening portion 46 to telescopically fit over the protruding portion 32. For this reason, the contact area S2 of the protruding portion 32 is preferably the three-fourths of the area of the stator opening portion.

Therefore, the work of telescopic fitting of the stator opening portion 46 over the protruding portion 32 is done without requiring a lot of time and effort.

Since the contact area S2 of the protruding portion 32 is at least the half of the area of the stator opening portion 46, the inner stator 13 ensures its heat-releasing property to thereby keep its temperature appropriate.

The outer rotor motor 10 as assembled includes the vibration isolating member 15 and the protruding portion 32 arranged in the manner stated above such that the air gap dimension L2 between the outer circumference 13a of the inner stator 13 and the plurality of permanent magnets 73 is set to a preferred dimension. In addition, the vibration isolating member 15 reduces the noise of the outer rotor motor 10 by suppressing or reducing the electromagnetic vibrating force of the inner stator 13. This results in an improvement of motor performance of the outer rotor motor 10.

The outer rotor motor according to the present invention is not limited to that discussed in the embodiment above, but may be modified or changed where appropriate. For example, the outer rotor motor, the motor case, the inner stator, the outer rotor, the vibration isolating member, the protruding portion, the mounting seat portion, the stator opening portion, the mounting portion, the metal base material and the pair of foam rubber layers are not limited to those discussed above, but may be modified or changed where appropriate.

The present invention is preferably applied to an outer rotor motor having an inner stator accommodated within a motor case, and an outer rotor disposed along an outer circumference of the inner stator.

Obviously, various minor changes and modifications of the present invention are possible in light of the above teaching. It is therefore to be understood that within the scope of the appended claims the invention may be practiced otherwise than as specifically described.

What is claimed is:

1. An outer rotor motor comprising a metal motor case having an inner space, an inner stator disposed in the inner space of the motor case and having an outer circumference, and an outer rotor disposed along the outer circumference of the inner stator, the motor case comprising:

a mounting seat portion provided in the inner space of the motor case, the mounting seat portion having an inside; and a protruding portion protruding from the inside of the mounting seat portion, the inner stator comprising:

an opening portion formed centrally of the inner stator, the opening portion being formed to telescopically fit over the protruding portion;

a mounting portion formed adjacent the opening portion, the mounting portion facing the mounting seat portion with the opening portion telescopically fitting over the protruding portion, the outer rotor motor further comprising:

a vibration isolating member interposed between the mounting seat portion and the mounting portion, the vibration isolating member including a metal member, a pair of elastic members sandwiching the metal member, and a pair of graphite layers laminated on surfaces of the elastic members, each graphite layer and the metal member being on opposite surfaces of each elastic member; and a fastener that is formed through the vibration isolating member in a direction along which the metal member, the elastic members, and the graphite layers are laminated, and that fastens the mounting portion and the mounting seat portion together while compressing the vibration isolating member.

2. The motor of claim 1, wherein the protruding portion has a contact area contacting the opening portion, the contact area being at least a half of an area of the opening portion.

3. An outer rotor motor comprising a metal motor case having an inner space, an inner stator disposed in the inner space of the motor case and having an outer circumference, and an outer rotor disposed along the outer circumference of the inner stator, the motor case comprising:

an annular boss portion protruding in the form of a tube around a case through-hole;

fastening boss portions protruding from an outer peripheral surface of the annular boss portion in a radial and outward direction of the case through-hole;

a mounting seat portion provided in the inner space of the motor case and made planar by a distal end portion of the annular boss portion and distal end portions of the fastening boss portions that are flush with one another, the mounting seat portion having an inside; and a protruding portion protruding from the inside of the mounting seat portion, the inner stator comprising:

an opening portion formed centrally of the inner stator, the opening portion being formed to telescopically fit over the protruding portion;

a mounting portion formed adjacent the opening portion, the mounting portion facing the mounting seat portion with the opening portion telescopically fitting over the protruding portion, wherein the mounting portion includes:

an annular part facing a distal end of the annular boss portion, and fastening parts protruding from an outer peripheral surface of the annular part in a radial outward direction of the opening portion to face the fastening boss portion, the outer rotor motor further comprising:

a vibration isolating member interposed between the mounting seat portion and the mounting portion, the vibration isolating member including a metal member, a pair of elastic members sandwiching the metal member, and a pair of graphite layers laminated on surfaces of the elastic members, each graphite layer and the metal member being on opposite surfaces of each elastic member; and a fastener that is formed through the vibration isolating member in a direction along which the metal member, the elastic members, and the graphite layers are laminated, and that fastens the mounting portion and the mounting seat portion together while compressing the vibration isolating member, wherein the vibration isolating member includes:

an annular vibration isolating portion interposed between the annular boss portion and the annular part, and fastening vibration isolating portions each interposed between the fastening boss portion and the fastening part.

4. The motor of claim 3, wherein the protruding portion has a contact area contacting the opening portion, the contact area being at least a half of an area of the opening portion.

* * * * *